United States Patent Office 2,730,264
Patented Jan. 10, 1956

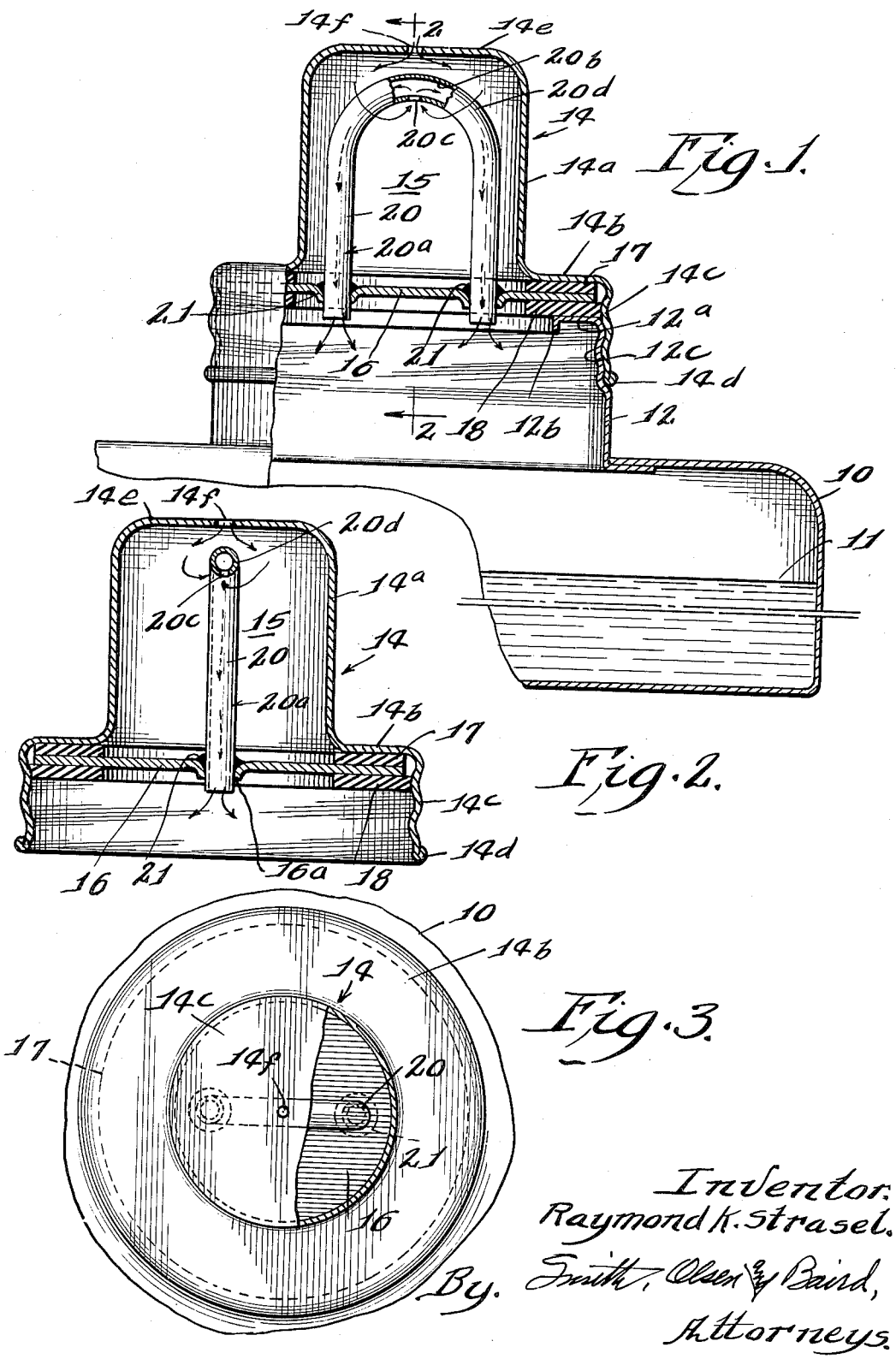

2,730,264
VENTED TANK CAP

Raymond K. Strasel, Winthrop Harbor, Ill., assignor to Jacobsen Manufacturing Company, Racine, Wis., a corporation of Wisconsin Application November 13, 1951, Serial No. 256,031

1 Claim. (Cl. 220—44)

This invention relates to improvements in closures for fuel tanks and its purpose is to provide a novel cap construction adapted for use on fuel tanks employed with internal combustion engines.

In the operation of engines supplied with fuel from a tank by means of suction feed or gravity feed carburetor systems, air must be permitted to enter the tank, as the fuel is used, in order to prevent the formation of a partial vacuum in the tank. If the tank is not vented to the atmosphere, the degree of vacuum in the tank will increase as the fuel is consumed until it balances the suction of the carburetor when a suction feed is employed, or until it balances the weight of the remaining fuel in the tank when a gravity feed is used. In either case the flow of fuel to the engine is stopped before the tank is emptied.

Devices which have heretofore been provided for permitting air to enter the fuel tank during the operation of the engine supplied therefrom have generally been objectionable because they have permitted dust and moisture to enter the tank and have allowed the fuel to escape, particularly when the tank has been subjected to severe vibration or unusual motion.

The principal object of the present invention is to provide a fuel tank cap capable of permitting the entrance of air into the tank while preventing the entrance of dirt or moisture and the escape of fuel. A further object of the invention is to provide a novel fuel tank cap having a chamber into which air enters from the atmosphere through a small opening or vent hole and from which air passes to the interior of the tank through a restricted passage having a small mouth which is not readily accessible to any dirt or moisture which may find its way into the chamber and which will direct away from said opening any fuel which finds its way from the tank through said passage. Still another object of the invention is to provide a fuel tank cap having an air chamber adapted to receive air from the atmosphere through a small opening and having a plurality of restricted passages leading into said tank and adapted to receive air from said chamber through a common restricted mouth. Another object is to provide an improved fuel tank cap comprising parts which may readily be assembled and disassembled. Other objects relate to various features of construction and arrangement which will appear more fully hereinafter.

The nature of the invention will be understood from the following specification taken with the accompanying drawings in which one embodiment is illustrated. In the drawings, Figure 1 shows a vertical section through a portion of a fuel tank and through the vertical axis of the cap embodying the present invention which is attached thereto;

Fig. 2 shows a vertical section through the improved fuel tank cap taken on the line 2—2 of Fig. 1; and Fig. 3 shows a top plan view of the cap shown in Fig. 1 with a part thereof shown in horizontal section.

As shown in the drawings, the improved fuel tank cap is applied to a fuel tank 10 containing a quantity of liquid fuel 11 and provided in its top wall with an attached tubular neck or sleeve 12 through which fuel is introduced into the tank. This inlet sleeve is provided with an inwardly turned flange 12a along its top edge which terminates at its inner margin in a downwardly turned lip 12b. The tank 10 and the neck 12 are ordinarily formed of sheet metal and the fuel 11 is adapted to be drawn off to the carburetor of an internal combustion engine either by suction or by gravity feed.

The upper part of the neck 12 is corrugated to form a threaded portion 12c adapted to be engaged by the cap 14 which comprises an upwardly extending dome 14a of cylindrical form which is united with an outwardly extending horizontal wall 14b and the outer edge of this wall is united with the depending annular skirt portion 14c which is threaded to engage the threads 12c of the neck 12. The skirt portion 14c is preferably rolled at its lower edge to provide a bead 14d. The circular top wall 14e of the dome-shaped portion 14a is provided with a centrally located vent hole 14f through which air enters the chamber 15 within the dome. This chamber 15 is separated from the interior chamber of the tank 10 by means of a metal baffle plate 16 which extends across the mouth of the neck 12 and overlaps the flange 12a. The baffle plate 16 is of circular form and is of somewhat smaller diameter than the inner diameter of the threaded skirt portion 14c of the cap so that it may be freely inserted and withdrawn. The outer edge of the baffle plate 16 is mounted between an annular gasket 17 and a sealing ring 18. The gasket 17 may be formed of leather, rubber or other compressible nonmetallic material and it is interposed between the lower surface of the flange 14b and the top surface of the plate 16. The sealing ring 18 is formed preferably of rubber but may be made of other nonmetallic compressible material and it engages the outer margin of the plate 16 on its under side beneath the gasket 17. The ring 18 has an outer diameter which is slightly larger than the interior surface diameter of the skirt portion 14c of the cap so that when the ring 18 is inserted into the part 14c it will have a sufficient interlocking or frictional engagement with the threaded skirt portion 14c to hold the baffle plate 16 and the gasket 17 in place within the skirt portion of the cap. When the cap 14 is screwed into engagement with the neck 12 of the tank, the sealing ring 18 and the gasket 17 are compressed with the ring 18 seating upon the flange 12a of the neck of the tank so that a fluid-tight connection is formed which prevents the escape of fuel between the cap member and the neck 12 when the fuel is splashed about during the movement of the tank.

The air which enters the chamber 15 through the vent hole 14f is adapted to find its way into the interior of the tank 10 above the fuel 11 through a U-shaped tube 20 which is mounted in inverted position with the legs 20a thereof extending through apertures 16a formed in the plate 16. These legs 20a preferably extend an appreciable distance beyond the lower surface of the plate 16 to which they are secured by solder or the like as shown at 21. The tube 20 has a restricted internal passage 20b into which air from the chamber 15 is adapted to pass through a restricted mouth or port 20c which is located at the center of the under side of the top curved portion 20d of the tube. The air passing through the port 20c may move downwardly through either leg 20a of the tube into the tank, thereby maintaining the pressure of the atmosphere within the interior of the tank regardless of the extent to which the fuel is withdrawn.

It will be apparent that the cap construction described above permits the entrance of air into the tank under all normal operating conditions while at the same time limiting the entrance of dust, dirt, water, or other solid particles which, on entering through the vent hole 14f, are trapped in the chamber 15 and are separated from the air which passes upwardly through the port 20c located on the under side of the top curved portion of the tube 20.

Also, the improved cap construction prevents the escape of fuel through the passages by which air is admitted to the tank. Since the lower ends of the legs 20a of the tube 20 project substantially below the lower surface of the plate 16, it is extremely unlikely that the liquid fuel, splashing about in the interior of the tank 10, will find its way into either leg of the tube. If it does, it is also very unlikely that it will clog both legs of the tube at the same time so that air is permitted to enter the space above the fuel in the tank even though one leg of the tube may be momentarily sealed by a quantity of fuel therein. Any fuel in one leg of the tube 20 is free to drop back readily into the tank since the column of fuel in the tube is freely replaced by air drawn into the tube either through the other leg or through the port 20c. If any fuel does enter very far into either leg of the tube 20 it will pass by centrifugal force along the outer or upper margin of the restricted passage in the top curved portion 20d of the tube so that it is unlikely to reach the port 20c through which air is admitted to the tube from the chamber 15. In the event that any liquid fuel does get through the port 20c into the chamber 15, it will fall by gravity and collect in the lower part of the chamber above the baffle plate 16 instead of being discharged through the centrally located vent hole 14f in the top wall 14e of the cap.

The mounting of the tube 20 so that it is supported by the baffle plate 16 with the baffle plate secured in position by the gasket 17 and the sealing ring 18, makes it possible to effect a ready cleaning of the cap and the removal of any dirt or fuel which may have collected in the chamber 15, by taking the cap off of the neck 12 of the tank and then removing the plate 16, the gasket 17, and the sealing ring 18 from the skirt portion of the cap member.

The inlet opening 14f and the port 20c should preferably be made relatively small and they are preferably located one above the other on the central vertical axis of the tubular portion 14a of the dome. By providing a single port 20c with a plurality of restricted passages leading therefrom to the interior of the tank, the continued passage of air to the tank is insured under all normal operating conditions as to temperature, quantity of fuel present in the tank and extent of vibration or movement of the tank. The ends of the tube 20 projecting below the baffle plate 16 tend to break up the flow of fuel splashing across the lower face of the baffle plate so that it drops back into the tank and, at the same time, the downward projection of these ends of the tube make it unlikely that any material quantity of fuel will enter either leg of the tube. If it does, it is likely to enter only one leg of the tube at a time and the probability is that it will flow back by gravity before it reaches the port 20c. If fuel should splash into both legs of the tube simultaneously, its upward flow through the legs is retarded by the body of air in the tube which can escape only through the restricted port 20c so that the upward flow of the fuel is likely to be arrested before it can enter the chamber 15 through the port in the tube. A further feature of advantage is that the chamber 15 is of substantial volume as compared with the vent 14f and the port 20c so that the body of air in the chamber tends to cushion any upsurge of fuel through both legs of the tube at the same time. If any fuel does enter the chamber 15 through the port 20c it collects on the baffle plate 16 which is quite far removed from the vent hole 14f and the normal movements of the tank and its cap are insufficient to cause this small quantity of fuel to find its way through the vent hole to the outer surface of the cap. This is of particular advantage in connection with the operation of two-cycle engines where lubricating oil is commonly mixed with the fuel since, even under those conditions, the oil is unlikely to find its way along the inner surface of the cap from the lower part of the chamber 15 to the vent hole 14f.

Although one form of the invention has been shown and described by way of illustration, it will be understood that it may be constructed in various other embodiments which come within the scope of the appended claim.

I claim:

A fuel tank cap adapted to engage the neck of a tank to close its inlet opening, comprising a body portion having a closed chamber of a certain size and a relatively small vent hole located at the highest point of the chamber for admitting air to said chamber, an inverted U-tube mounted in said chamber with its curved portion adjacent said highest point and both of its legs extending through the lowest wall of said chamber into said tank and providing a plurality of spaced apart passages in communication with said tank, said tube having a relatively small port located at the center of the under side of the curved portion thereof to communicate said chamber and said passages, said relatively small vent hole and said relatively small port allowing the flow of air from the atmosphere and from said tank into said chamber at only a limited rate.

References Cited in the file of this patent

UNITED STATES PATENTS

| | | |
|---|---|---|
| 659,764 | Ralston | Oct. 16, 1900 |
| 702,070 | Paul | June 10, 1902 |
| 995,314 | Abs | June 13, 1911 |
| 1,339,485 | Stranahan | May 11, 1920 |
| 1,429,296 | Obert | Sept. 19, 1922 |
| 1,487,986 | Sweet | Mar. 25, 1924 |
| 1,996,292 | Harding et al. | Apr. 2, 1935 |
| 2,548,298 | Simons | Apr. 10, 1951 |

FOREIGN PATENTS

| | | |
|---|---|---|
| 36,347 | Denmark | July 29, 1926 |
| 281,391 | Italy | Jan. 12, 1931 |